(12) United States Patent
Hemmann et al.

(10) Patent No.: US 10,577,270 B2
(45) Date of Patent: Mar. 3, 2020

(54) METHOD FOR CONTROLLED OPERATION OF A HEATED, IN PARTICULAR REGENERATIVELY HEATED, INDUSTRIAL FURNACE, OPEN-LOOP AND CLOSED-LOOP CONTROL UNIT, AND HEATABLE INDUSTRIAL FURNACE

(71) Applicant: STG COMBUSTION CONTROL GMBH & CO. KG, Cottbus (DE)

(72) Inventors: Peter Hemmann, Cottbus (DE); Andreas Birle, Cottbus (DE); Norwid Hemmann, Cottbus (DE); Jürgen Kortt, Cottbus (DE)

(73) Assignee: STG COMBUSTION CONTROL GMBH & CO. KG, Cottbus (DE)

( * ) Notice: Subject to any disclaimer, the term of this patent is extended or adjusted under 35 U.S.C. 154(b) by 170 days.

(21) Appl. No.: 15/555,706

(22) PCT Filed: Mar. 4, 2016

(86) PCT No.: PCT/EP2016/054715
§ 371 (c)(1),
(2) Date: Sep. 5, 2017

(87) PCT Pub. No.: WO2016/139363
PCT Pub. Date: Sep. 9, 2016

(65) Prior Publication Data
US 2018/0057386 A1 Mar. 1, 2018

(30) Foreign Application Priority Data
Mar. 5, 2015 (DE) .................. 10 2015 203 978

(51) Int. Cl.
*C03B 5/235* (2006.01)
*C03B 5/24* (2006.01)
(Continued)

(52) U.S. Cl.
CPC ............... *C03B 5/24* (2013.01); *C03B 5/235* (2013.01); *C03B 5/237* (2013.01); *C03B 5/2353* (2013.01);
(Continued)

(58) Field of Classification Search
CPC .................................................. C03B 5/2353
USPC ....................................................... 431/12, 76
See application file for complete search history.

(56) References Cited

U.S. PATENT DOCUMENTS

| 4,162,889 A | * | 7/1979 | Shigemura | ............... F23N 3/08 431/76 |
| 9,242,884 B2 | | 1/2016 | Hemmann et al. | |

(Continued)

FOREIGN PATENT DOCUMENTS

| AT | 505 064 A1 | 10/2008 |
| CN | 101588995 A | 11/2009 |

(Continued)

*Primary Examiner* — Avinash A Savani
(74) *Attorney, Agent, or Firm* — Seed Intellectual Propery Law Group LLP

(57) ABSTRACT

A method for controlled operation of a heated industrial furnace having a furnace chamber is provided. Fuel is conducted into the furnace chamber virtually without combustion air and a gaseous oxygen carrier is also conducted. The supply of fuel and the gaseous oxygen carrier is controlled by a control loop. A first adjustable manipulated variable in the form of a flow of fuel and/or a second adjustable manipulated variable in the form of a flow of the gaseous oxygen carrier is set by a final controlling element. In the control loop, an energy requirement is determined and fed to a quantitative control and to a quantitative fuel control for the fuel. The flow of the gaseous oxygen carrier is determined as a process value of a flow of the gaseous oxygen carrier and the flow of fuel is determined as a process value of a volumetric flow of fuel.

19 Claims, 5 Drawing Sheets

(51) Int. Cl.
*F23N 1/02* (2006.01)
*C03B 5/237* (2006.01)
*F23N 5/02* (2006.01)
*F23N 5/20* (2006.01)
*F27B 9/30* (2006.01)

(52) U.S. Cl.
CPC ............ *F23N 1/022* (2013.01); *F23N 5/022* (2013.01); *F23N 5/203* (2013.01); *F27B 9/3044* (2013.01); *F23N 2023/36* (2013.01); *F23N 2025/08* (2013.01); *F23N 2037/28* (2013.01); *Y02P 40/535* (2015.11); *Y02P 40/55* (2015.11)

(56) References Cited

U.S. PATENT DOCUMENTS

| | | | |
|---|---|---|---|
| 9,360,209 B2* | 6/2016 | Behmann | .................. F23D 1/02 |
| 2010/0050691 A1 | 3/2010 | Ward et al. | |
| 2013/0260325 A1 | 10/2013 | Min | |
| 2013/0302738 A1 | 11/2013 | Rennie et al. | |
| 2014/0011148 A1* | 1/2014 | Hemmann | .............. C03B 5/235 432/30 |

FOREIGN PATENT DOCUMENTS

| | | |
|---|---|---|
| CN | 103221348 A | 7/2013 |
| CN | 103221349 A | 7/2013 |
| CN | 103261791 A | 8/2013 |
| CN | 103388834 A | 11/2013 |
| DE | 213 746 | 9/1984 |
| DE | 10 2010 041 155 A1 | 3/2012 |
| DE | 10 2010 041 157 A1 | 3/2012 |
| DE | 10 2013 204 840 A1 | 9/2014 |
| JP | 2008-232501 A | 10/2008 |

\* cited by examiner

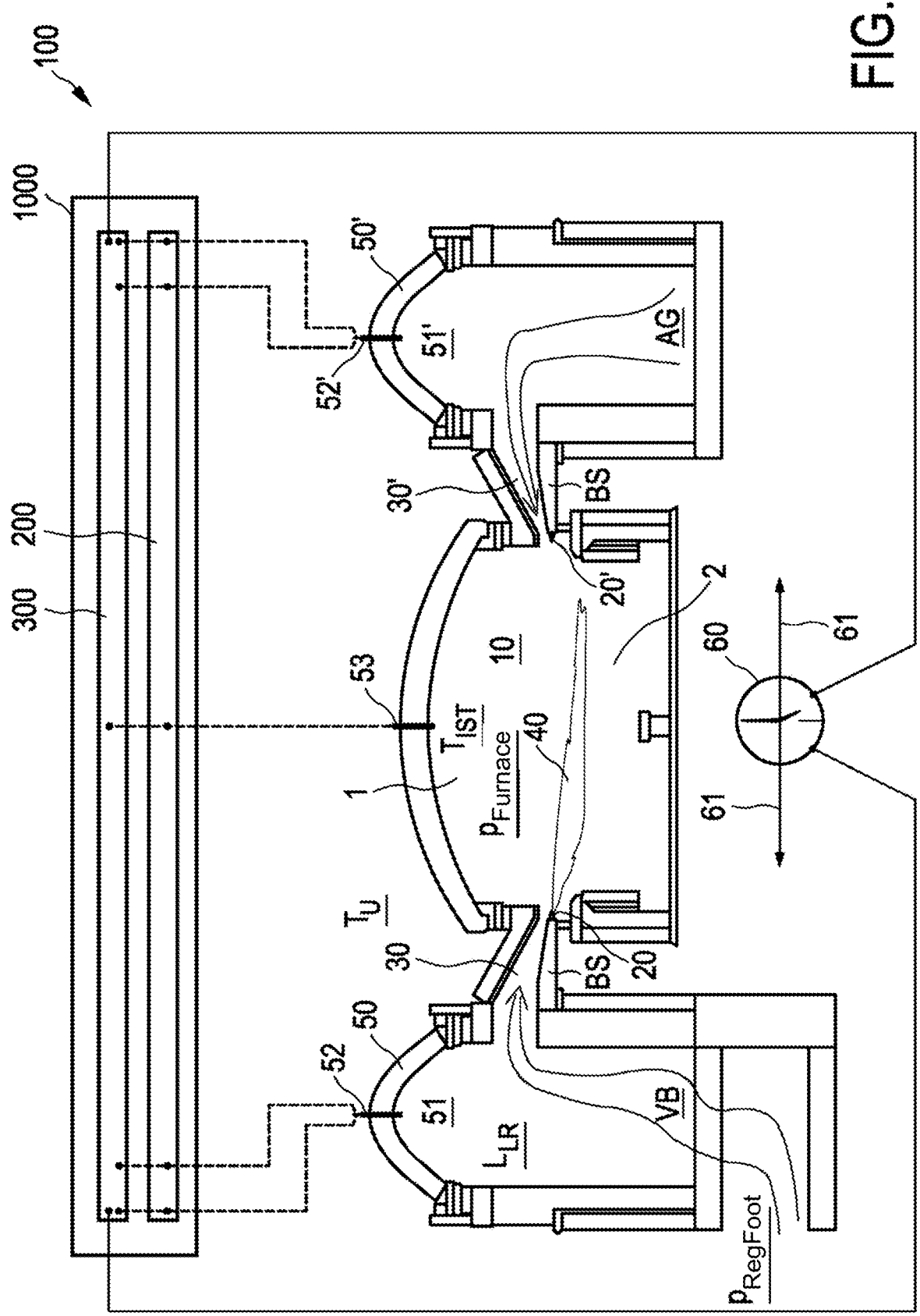

METHOD FOR CONTROLLED OPERATION OF A HEATED, IN PARTICULAR REGENERATIVELY HEATED, INDUSTRIAL FURNACE, OPEN-LOOP AND CLOSED-LOOP CONTROL UNIT, AND HEATABLE INDUSTRIAL FURNACE

BACKGROUND

Technical Field

The invention relates to a method for the controlled operation of a heated industrial furnace, in particular a regeneratively heated industrial furnace, and to an open-loop and closed-loop control unit and to a heatable industrial furnace.

Description of the Related Art

In principle, an industrial furnace of the type mentioned at the beginning is not restricted to use in glass production. For example, an industrial furnace of the type mentioned at the beginning can also be used in metal production or the like. A regenerative industrial furnace of the type mentioned at the beginning has however proven to be particularly suitable in glass production for the melting of glass.

In the case of a heated industrial furnace, in particular a regeneratively heated industrial furnace, there is often a separate supply of fuel and of a gaseous oxygen carrier, in particular combustion air and/or oxygen, so that for this reason alone a special open-loop and closed-loop control is required, as distinct from burner controls, which supply combustion air and/or oxygen by way of a common burner.

Until now, the control of regenerative glass melting furnaces—i.e., often by means of control by way of the upper furnace in the furnace chamber as a controlled system—has been exclusively entrusted to closed-loop controllers, such as PID controllers or the like, which are aimed at controlling the furnace temperature, specifically generally the upper furnace temperature, and the output of which either represents a quantity of fuel itself or a quantity of combustion air, which however the quantity of fuel then follows in an adjustable relationship; there is therefore always a quantity of fuel at the output of such control systems.

According to generally adopted practice, a charge of fuel gas as a fuel to industrial furnaces is continuously corrected, either manually by the operator of the installation or by an automatic controller, in order to counteract detectable changes of the measured furnace temperature and maintain the setpoint temperature as constantly as possible. If variations of the energy content of the fuel gas thereby occur, it is expected that the operator of the installation or the temperature controller will likewise compensate for this—by then choosing the necessary quantity of fuel gas—in such a way that the specified setpoint temperature can be maintained.

On account of the high heat-retaining capacity of an industrial furnace, including the material it is heating, however, changes in temperature usually only become apparent after hours, and their correction takes a similarly great or longer amount of time, because the adapted quantity of fuel gas first has to be found by the control algorithm. A particularly advantageous control method of the applicant's, on the basis of a temperature control, is known for example from DE 10 2010 041 155 A1. It is explained therein that, among the prerequisites for efficient heating are a stable, uniform flow of fuel without unnecessary variations, and possibly the thermal symmetry of regenerators.

When there is an existing calorific value measurement or other on-line measurement of the energy content of the fuel gas, it is usual to adapt the setpoint value of the quantity of fuel gas manually or automatically in accordance with a measured change in the calorific value or the Wobbe index of the fuel gas. However, it is widely the case that the air ratio between the fuel gas and the combustion air is not changed thereby.

DD 213 746 describes a method for optimizing gas-air mixtures, in particular for town gas, in which therefore the fuel-air mixture is changed in dependence on the Wobbe index of the fuel gas and the $O_2$ content in the flue gas. For this purpose there takes place the feedforwarding of a measured change in the Wobbe index to the control of the fuel gas supply, and at the same time the feedforwarding of the volumetric flow of fuel, the Wobbe index and a measured $O_2$ content as a correction of the setpoint value of the fuel-air supply. However, experience shows that, in particular for near-stoichiometric combustion, the introduction of a controlling correction, first of the quantity of fuel gas and then once again of the quantity of combustion air, leads to an undesired inaccuracy of the control, which for the method thus described is evidently corrected again subsequently by the additional feedforwarding of a measured $O_2$ concentration in the flue gas. For the increasingly more important case of near-stoichiometric or deliberately substoichiometric combustion, this method is no longer suitable.

To an increasing extent, industrial furnaces are thus being supplied with fuel gases of varying composition, since the fuel gases are increasingly frequently being mixed from different sources, for example natural gas from Russia, natural gas from the North Sea, natural gas from North Africa, natural gas from fracking, etc.

Variations of the fuel gas composition have concomitant effects:
  on the flow of energy that is input into the industrial furnace,
  on the associated requirement for combustion air or oxygen,
  on the correctness of the volumetric fuel gas flow measurement as a consequence of varying gas density,
  on the thermal efficiency of the flames as a result of changed heat losses with the flue gas flow emerging from the furnace chamber,
  on the combustion dynamics of the flames in the industrial furnace in response to the flame pulse.

However, the conventional control methods thus prove to be too slow. In particular, they do not ensure the predictive reaction to measurable fuel gas variations, i.e., they only react to a changing of furnace temperatures that becomes evident very much later, for example possibly hours later.

Allowance should also be made for the fact that the fuel charge and the dosing of oxygen or combustion air must be corrected at the same time in order to ensure firing that remains constant. Industrial furnaces are all the more sensitive to such problems in this respect the closer the combustion is operated to near-stoichiometric, for example in order to keep down the emission of nitrogen oxide and similarly the energy consumption.

Allowance should also be made for the fact that the on-line measurement of the energy content of a fuel gas and the simultaneous on-line determination of the stoichiometric combustion air/oxygen requirement per unit of energy impose demanding requirements on the measuring instrumentation required for this purpose and its accuracy (gas chromatographs); for relatively small and medium-sized installations, meeting these requirements often involves a disproportionate effort.

Accordingly, a control method that can dependably provide the metering both of fuel gas and of oxygen and/or combustion air that is suitable for ensuring constant and optimized combustion conditions just by a reliable on-line measurement of the calorific value of the fuel gas would be desirable. A particularly advantageous control method of the applicant's, in particular also for the increasingly more important case of near-stoichiometric or deliberately substoichiometric combustion, is known for example from DE 10 2010 041 157 A1. The stated control method has a lambda control with infiltrated air indication, which is used to compensate for varying infiltrated air. It has also been recognized there that a regeneratively fired industrial furnace can be observed to undergo typical recurring trend patterns of uncontrolled infiltrated air ingress or uncontrolled infiltrated air loss that cannot be compensated, or only incompletely, by a gradual and slow correction of the air ratio, while a rapid correction of the air ratio fails on account of unfavorable control dynamics of the industrial furnace.

If, during its application, variations of the fuel gas composition occur, this is interpreted as a variation of the infiltrated air and is corrected. Although this approach is heading in the right direction, the mixing of different physical effects (for example changes of the actual infiltrated air and changes of this stoichiometric combustion air/oxygen requirement per unit of energy as a consequence of variations of the fuel gas composition) easily leads to problems in the accuracy or dynamics of the control.

Accordingly, a control method that compensates for the influence of variations of the actual infiltrated air and the influence of variations of the fuel gas composition in different controlled variables, but acting at the same time effect, would also be desirable. Such a control method should be as robust as possible and as insensitive as possible to variations in accuracy.

BRIEF SUMMARY

Provided is a method and a device for control with which the problems described herein are at least to some extent eliminated or mitigated. In particular, provided is an improved method and device for controlled operation of a heated industrial furnace, in particular a regeneratively heated industrial furnace, in particular with a melting end, in particular for glass, and also a control designed therefor and an improved regeneratively heated industrial furnace and also an improved control unit.

The method and the device should preferably be effective even when are variations of the fuel composition, in particular fuel-gas composition. The method and the device should preferably also be effective for the increasingly more important case of near-stoichiometric or deliberately sub stoichiometric combustion. In particular, a control method of the method and the device should be as robust as possible and as insensitive as possible to fuel compositions, in particular fuel-gas compositions, and/or accuracy variations. The control method should be capable of dependably providing the metering both of fuel gas and of oxygen and/or combustion air that is suitable for ensuring improved, in particular constant and optimized, combustion conditions just by a reliable on-line measurement of the calorific value of the fuel gas.

The formula symbols indicated in this description—often between parentheses—are intended for purposes of explanation, but are not in any way meant restrictively with regard to the subject matter that is actually being claimed.

A method for controlled operation of a heated industrial furnace, in particular a regeneratively heated industrial furnace is disclosed.

An embodiment is based on a method for the controlled operation of a heated industrial furnace (100) with a furnace chamber (10). This may preferably be a regeneratively heated industrial furnace (100) with a furnace chamber (10). With preference, the furnace chamber may have a melting end, in particular for glass.

The method comprises the steps of:
conducting fuel into the furnace chamber by way of at least one fuel injector, which is designed for the injection of fuel, in particular virtually without combustion air,
conducting a gaseous oxygen carrier, in particular combustion air and/or oxygen, to the furnace chamber, wherein
the supply of fuel and the supply of the gaseous oxygen carrier, in particular combustion air and/or oxygen, is controlled by means of a control loop, in particular is controlled automatically, and
a first adjustable manipulated variable in the form of a flow of fuel to the furnace chamber and/or a second adjustable manipulated variable in the form of a flow of the gaseous oxygen carrier, in particular flow of combustion air and/or flow of oxygen, to the furnace chamber is set by a final controlling element.

It is provided that in the control loop:
an energy requirement (E) is determined, in particular as an energy SETPOINT value (SP_ENERGY), and
the energy requirement (E) is fed to a quantitative control (VB-R) for the gaseous oxygen carrier, in particular for a quantity of combustion air and/or a quantity of oxygen, and to a quantitative fuel control (BS-R) for the fuel, and
the flow of the gaseous oxygen carrier, in particular the flow of combustion air and/or the flow of oxygen, is determined, in particular as a process value of a flow of the gaseous oxygen carrier, in particular a volumetric flow of combustion air (SP_COMBAIR) and/or a volumetric flow of oxygen (SP_OXYGEN), with allowance—optionally with subtraction of infiltrated air and/or further air corrections—for a product of:
a specified, in particular constantly specified, air/oxygen excess (SP_LAMBDA),
directly the energy requirement (E), in particular as an energy SETPOINT value (SP_ENERGY), and
a specified stoichiometric combustion air/oxygen requirement, in particular constantly specified as an "energy-related air/oxygen" constant (LMINE, OMINE, LMINX), as a quantity of air/oxygen per unit of energy, and
the flow of fuel is determined, in particular as a process value of a volumetric flow of fuel (SP_FUELGAS), with allowance—optionally with correction by way of a fuel limitation and/or further fuel corrections—for a quotient of:
directly the energy requirement (E), in particular as an energy SETPOINT value (SP_ENERGY), and
a calorific value of the fuel (BS).

With respect to the stated product, it is preferably provided that:

the specified, in particular constantly specified, air/oxygen excess (SP_LAMBDA) is obtained from a technologically optimized process control and/or the energy requirement (E), in particular as the energy SETPOINT value (SP_ENERGY), is obtained from a specification of a temperature for the furnace chamber (10), and/or the specified stoichiometric combustion air/oxygen requirement, in particular constantly specified as an "energy-related air/oxygen" constant (LMINE, OMINE, LMINX), is obtained from a long-term determination.

With respect to the stated quotient, it is preferably provided that:

the energy requirement (E), in particular as the energy SETPOINT value (SP_ENERGY), is obtained from a specification of a temperature for the furnace chamber (10), the calorific value of the fuel (BS) is obtained from a calorific value of the fuel (BS) determined at the particular time.

Disclosed is an open-loop and/or closed-loop control unit; in particular, the open-loop and/or closed-loop control unit is designed for carrying out a method according to the concept of the disclosure and/or one of its developments.

The open-loop and/or closed-loop control unit for controlling operation of a regeneratively heated industrial furnace with a furnace chamber, in particular with a melting end, in particular for glass, has a control module with:

a module (203) with which the energy requirement (E) is determined, in particular as an energy SETPOINT value (SP_ENERGY), and a control connection by means of which the energy requirement (E) is fed to a quantitative control (VB-R) for the gaseous oxygen carrier, in particular for a quantity of combustion air and/or a quantity of oxygen, and to a quantitative fuel control (BS-R) for the fuel, and with the quantitative control (VB-R) for the gaseous oxygen carrier, in which the flow of combustion air is determined in particular as a process value of a flow of the gaseous oxygen carrier, in particular of a volumetric flow of combustion air (SP_COMBAIR) and/or a volumetric flow of oxygen (SP_OXYGEN), with allowance—optionally with deduction of infiltrated air and/or further air corrections—for a product of:

a specified, in particular constantly specified, air/oxygen excess (SP_LAMBDA), directly the energy requirement (E), in particular as an energy SETPOINT value (SP_ENERGY), and a specified stoichiometric combustion air/oxygen requirement, in particular constantly specified as an "energy-related air/oxygen" constant (LMINE, OMINE, LMINX), as a quantity of air/oxygen per unit of energy, and with the quantitative control of fuel (BS-R), in which the flow of fuel is determined, in particular as a process value of a volumetric flow of fuel (SP_FUELGAS) with allowance—optionally with correction by way of a fuel limitation and/or further fuel corrections—for a quotient of:

directly the energy requirement (E), in particular as an energy SETPOINT value (SP_ENERGY), and a calorific value of the fuel (BS).

A concept described here also leads to an industrial furnace; in particular, the industrial furnace is designed to be operated by a method described herein and/or one of its developments.

Provided is a regeneratively heatable industrial furnace with a furnace chamber, in particular with a melting end, in particular for glass, having:

a conduit for fuel into the furnace chamber by way of at least one fuel injector, which is designed for the injection of fuel, in particular virtually without combustion air, a conduit for a gaseous oxygen carrier, in particular combustion air and/or oxygen, to the furnace chamber, wherein the supply of fuel and the supply of the gaseous oxygen carrier, in particular combustion air and/or oxygen, is controlled by means of a control loop, in particular is controlled automatically, and a first adjustable manipulated variable in the form of a flow of fuel to the furnace chamber and/or a second adjustable manipulated variable in the form of a flow of the gaseous oxygen carrier, in particular flow of combustion air and/or flow of oxygen, to the furnace chamber is set by a final controlling element, and with the control module of the open-loop and/or closed-loop control unit.

Fuel should be understood in particular as meaning fuel gas. Other fuels such as oil, for example heating oil, or the like are likewise possible for operating an industrial furnace. Mixtures of fuel gas and fuel oil are also possible.

An injector should be understood in particular as meaning a single-nozzle unit that is designed for injecting fuel directly upstream of a furnace chamber in a feed zone or in the furnace chamber, in particular separately from combustion air. A mixing of combustion air and fuel is not envisaged until the furnace chamber.

The furnace chamber has in particular an upper furnace and a lower furnace. A lower furnace has in particular a glass melting end or the like.

A gaseous oxygen carrier should be understood in the present case as meaning in particular air (combustion air) or oxygen, i.e., gas with an oxygen fraction >99%, i.e., generally a gaseous oxygen carrier such as for example air with a 20.94% oxygen fraction, technical oxygen with a virtually 100% oxygen fraction but similarly also combustion air enriched with oxygen, with for example an oxygen fraction of 21 . . . 25%, or combustion air depleted with flue gas with for example an oxygen fraction of 17 . . . 21%. Thus, if reference is made hereinafter to the combustion air/oxygen requirement per unit of energy, this should also be understood as correspondingly meaning: the requirement for combustion air, the flow of combustion air, the quantitative control of combustion air, or—optionally in addition or alternatively—the requirement for combustion oxygen, the flow of combustion oxygen, the quantitative control of combustion oxygen, the combustion oxygen requirement. To this extent, in the present case there is most certainly a distinction to be drawn between air and oxygen. However, it is also the case in principle that, when in this application an explanation is given by way of example only with respect to "air" or "oxygen", another gaseous oxygen carrier by way of example also—optionally in addition or alternatively—comes into consideration.

Further advantageous developments can be taken from the subclaims and specifically indicate advantageous possibilities for realizing the concept explained above of the method and/or of the control unit and/or of the industrial furnace within the scope set and also with regard to further advantages.

A development—concerning aspects of the concept of the disclosure with respect to combustion air—preferably relates to a method for controlling fuel, in particular fuel gas, and combustion air of an industrial furnace or a partial region of an industrial furnace, with predictive compensation for variations of the composition of the fuel, in particular the fuel gas. According to the development, it is provided in particular that the setpoint value of the volumetric flow of combustion air (SP_COMBAIR) follows an energy SETPOINT value (SP_ENERGY) in a fixed relationship (LMINE) of the quantity of combustion air per unit of energy, multiplied by a setpoint value for the desired air excess (SP_LAMBDA), while at the same time the setpoint value of the flow of fuel, in particular fuel gas (SP_FUELGAS), follows the same energy SETPOINT value (SP_ENERGY) in a variable relationship, formed by the reciprocal of the lower calorific value measured at the particular time as energy per volumetric unit of fuel gas.

A development of the disclosure—concerning aspects with respect to oxygen—preferably relates to a method for controlling fuel, in particular fuel gas, and oxygen of an industrial furnace or a partial region of an industrial furnace, with predictive compensation for variations of the composition of the fuel gas. According to the development, it is provided in particular that the setpoint value of the flow of oxygen (SP_OXYGEN) follows an energy SETPOINT value (SP_ENERGY) in a fixed relationship (OMINE) of the quantity of oxygen per unit of energy, multiplied by a setpoint value for the desired oxygen excess (SP_LAMBDA), while at the same time the setpoint value of the flow of fuel gas (SP_FUELGAS) follows the same energy SETPOINT value (SP_ENERGY) in a variable relationship, formed by the reciprocal of the lower calorific value measured at the particular time as energy per volumetric unit of fuel gas.

It is preferably provided that
the flow of the gaseous oxygen carrier, in particular the flow of combustion air and/or the flow of oxygen, in particular as a process value of a flow of the gaseous oxygen carrier, in particular a volumetric flow of combustion air (SP_COMBAIR) and/or a volumetric flow of oxygen (SP_OXYGEN), follows the fixed specified stoichiometric combustion air/oxygen requirement, constantly specified as an "energy-related air/oxygen" constant (LMINE, OMINE, LMINX), as a quantity of air/oxygen per unit of energy that is obtained from a long-term determination.

It is in addition or alternatively provided that
the flow of fuel, as a process value of a volumetric flow of fuel (SP_FUELGAS), follows:
a variably specified reciprocal of the calorific value of the fuel (BS),
as a calorific value of the fuel (BS) determined at the particular time, as a quantity of fuel per unit of energy.

It is preferably provided for a temperature control that
the energy requirement (E) is determined from a system deviation between an ACTUAL value of a temperature (T), in particular a measured and/or computationally determined temperature, of the furnace chamber. In addition or alternatively, it may be provided for this purpose that
the final controlling element is assigned to the control loop (RS) and the temperature control is integrated in the control loop (RS) with the furnace chamber temperature as a controlled variable and a controller, in particular a PID controller, in the control loop (RS).

It is preferably provided that the energy requirement (E) is determined
along with specification of a desired temperature of the furnace chamber and/or of the energy requirement (E), in particular independently of a temperature control in the control loop (RS), and/or
as a result of a higher-level temperature control, a simulation on the basis of a furnace model and/or a precontrol.

It is preferably provided that the industrial furnace is a regeneratively heated industrial furnace and/or the method comprises the steps of:
periodically alternately conducting on the one hand combustion air to the furnace chamber in a first time period and on the other hand flue gas (AG) out of the furnace chamber in a second time period separately from the fuel by means of a left regenerator and a right regenerator which are assigned to the at least one fuel injector and are designed for the regenerative storage of heat from the flue gas and transfer of heat to the combustion air.

It is preferably provided that the flow of the gaseous oxygen carrier, in particular flow of combustion air and/or flow of oxygen, is determined in particular as a process value of a flow of the gaseous oxygen carrier, in particular volumetric flow of combustion air (SP_COMBAIR) and/or volumetric flow of oxygen (SP_OXYGEN), with allowance for the stated product and optionally with subtraction of infiltrated air and/or further air corrections or with subtraction of an oxygen fraction of a value of the infiltrated air and/or an oxygen fraction of a value of the further air corrections.

The option concerning the subtraction of infiltrated air or the subtraction of an oxygen fraction of a value of the infiltrated air is preferably provided:
an additive or subtractive allowance for the infiltrated air or the oxygen fraction of the value of the infiltrated air, and/or, that
this is obtained from the summary comparison of the setpoint value for the air/oxygen excess (SP_LAMBDA) with a measured air/oxygen excess (SP_LAMBDA),
in particular as a result of a continuous flue gas analysis at the end of the combustion chamber.

A development in this respect—concerning combustion air—relates to a method in which the formed setpoint value of the volumetric flow of fuel gas (SP_COMBAIR) is increased (additively) or reduced (subtractively) by a value (INACCAIR), wherein the value (INACCAIR) represents the sum of all the uncontrolled ingresses minus uncontrolled egresses and also a systematic repeatable measuring inaccuracy of the flow of combustion air. The value (INACCAIR) can be obtained, in particular as the result of a continuous flue gas analysis at the end of the combustion chamber, for example in the head of a regenerator conducting flue gas or in the regenerator conducting flue gas or a duct conducting flue gas. Essentially, a summary comparison of a measured air excess (process value PV_LAMBDA) (possibly optionally of a setpoint value for the air excess (SP_LAMBDA)) for example with the actual charge of combustion air at the industrial furnace may be used.

Correspondingly, a development in this respect—concerning oxygen—relates to a method in which the formed setpoint value of the flow of oxygen SP_OXYGEN is reduced by the oxygen fraction of a value (INACCAIR), wherein the value (INACCAIR) represents the sum of all the uncontrolled ingresses minus uncontrolled egresses and also a systematic repeatable measuring inaccuracy and impurity of the flow of oxygen. The value of the infiltrated air can be obtained in principle from the summary comparison of the of a measured air excess and/or oxygen excess (PV_LAMBDA), in particular as the result of a continuous flue gas analysis at the end of the combustion chamber, (possibly optionally of a setpoint value for the air excess and/or oxygen excess (SP_LAMBDA)) for example with the actual charge of combustion air at the industrial furnace.

Within the scope of a preferred development, it is provided that the value of the infiltrated air is obtained from the product of a measured air/oxygen excess (process value PV_LAMBDA) multiplied by the constantly specified, stoichiometric combustion air/oxygen requirement as a quantity of air/oxygen per unit of energy (LMINE), multiplied by the energy input (E) into the furnace as an ACTUAL value, minus an independently measured quantity of air at the inlet of the furnace (process value of the combustion air PV_AIR), in particular as the result of a continuous flue gas analysis at the end of the combustion chamber, preferably in a flue gas duct or in a head of a regenerator conducting flue gas.

Optionally, a quotient (SP_ENERGY/µ_therm) of the energy SETPOINT value (SP_ENERGY) and the thermal efficiency (µ_therm) may possibly be used instead of the energy input.

With particular preference, it is provided that
a time profile of the values for infiltrated air or an oxygen fraction respectively of the values of the infiltrated air is determined, in particular measured and/or obtained, and
the time profile is smoothed or treated with a compensation method, in particular with a statistical or error compensation method, in particular wherein
an approach for the smoothing or similar compensation is obtained from a model-based functional determination of the infiltrated air.

The infiltrated air or the oxygen fraction of the value of the infiltrated air may preferably be determined as a function of a furnace pressure (p_Furnace), a pressure at the foot of the regenerator (p_RegFoot), a temperature of the combustion air in the regenerator (T_VB) and a temperature of the surroundings of the furnace (T_U); in particular be determined as XFM (p_Furnace, p_RegFoot, T_VB, T_U).

In addition or alternatively, it has proven to be advantageous within the scope of a particularly preferred development that the option concerning the subtraction of infiltrated air or the subtraction of an oxygen fraction of a value of the infiltrated air concerns an additive or subtractive allowance for the infiltrated air or the oxygen fraction of the value of the infiltrated air. According to a particularly preferred development, this approach can therefore be supported by means of a model-based functional determination of the infiltrated air. The infiltrated air or the oxygen fraction of the value of the infiltrated air is advantageously determined as a function of a furnace pressure (p_Furnace), a pressure at the foot of the regenerator (p_RegFoot), a temperature of the combustion air in the regenerator (T_VB) and a temperature of the surroundings of the furnace (T_U); in particular is determined as XFM (p_Furnace, p_RegFoot, T_VB, T_U).

This development has recognized that the typical recurring trend patterns mentioned at the beginning and known from DE 10 2010 041 157 A1 of an uncontrolled ingress of infiltrated air or the uncontrolled loss of infiltrated air in the case of a regeneratively fired industrial furnace can be attributed to the interaction at least of a furnace pressure (p_Furnace), a pressure at the foot of the regenerator (p_RegFoot), a temperature of the combustion air in the regenerator (T_VB) and a temperature of the surroundings of the furnace (T_U); in particular, the infiltrated air is consequently determined as a function XFM (p_Furnace, p_RegFoot, T_VB, T_U).

The infiltrated air is in that case therefore measured, and its at least basic profile or tendency (trend pattern) can advantageously be anticipated and/or allowed for within a closed-loop and/or open-loop control, at least in the trend pattern, with allowance for the stated basic variables in a stored model of the industrial furnace.

Specifically, for this purpose an additive or subtractive allowance for the infiltrated air or the oxygen fraction of the value of the infiltrated air is provided, wherein a time profile of the values for infiltrated air or an oxygen fraction respectively of the values of the infiltrated air is determined, in particular measured, preferably obtained from the summary comparison of the setpoint value for the air/oxygen excess (SP_LAMBDA) with a measured air/oxygen excess (SP_LAMBDA). The time profile is smoothed, in particular by a statistical or error compensation method. This is so because it is found that in principle an infiltrated air profile determined in such a way is subject to strong variations, which initially appear statistically. The time profile is consequently only appropriate for input into a closed-loop control process in the smoothed or compensated form. A smoothing may take place purely statistically on the basis of the time profile of the infiltrated air and/or with linear or polynomial interpolation with the aid of the method of least squares, for example with respect to the compensation line. This can still be improved, because a purely statistical smoothing may include errors and an interpolation approach tends to be unstable in the case of trend patterns that change over time, in particular for different firing periods. However, it has been recognized within the scope of the development that a model-based functional determination of the infiltrated air can serve as an approach for the smoothing. In particular, in this case the infiltrated air or the oxygen fraction of the value of the infiltrated air can be determined as a function of a furnace pressure (p_Furnace), a pressure at the foot of the regenerator (p_RegFoot), a temperature of the combustion air in the regenerator (T_VB) and a temperature of the surroundings of the furnace (T_U); in particular is determined as XFM (p_Furnace, p_RegFoot, T_VB, T_U). Such a function also takes changing trend patterns into account.

The following model assumption serves for the model of the infiltrated air function, in particular as an approach for the smoothing of the actual infiltrated air profile according to the values of the infiltrated air determined over time. The model advantageously initially assumes that the infiltrated air develops as a consequence of differences in pressure of a furnace pressure on the one hand and a pressure at the foot of the regenerator on the other hand, or an external pressure outside the furnace. In simplified terms, the tendency appears to be such that, with decreasing furnace pressure, a pressure at the foot of the regenerator or an external pressure outside the furnace predominates and is capable of additionally forcing air into the furnace as infiltrated air. The model approach therefore has the effect that a smoothing level for infiltrated air tends to rise when there is a decreasing furnace pressure or tends to fall when there is an increasing furnace pressure. In addition, the model assumption assumes that a temperature of the combustion air in the regenerator influences the density of the same and to this extent, when there are cyclically recurring changes in temperature, the density of the air in the regenerator also cyclically changes. To this extent, this likewise leads to a modulation of the pressure in the regenerator on the basis of the cyclically recurring change in the density of the air in the regenerator. The cyclical temperature development in turn essentially has the result that the combustion air enters the furnace chamber from the regenerator in a cyclically recurring manner, and to this extent heat is extracted from the regenerator. As a result, the model has recognized that, with increasing cooling of the air in the regenerator, the density of the same rises and ingress of infiltrated air correspondingly falls, and vice versa. The model leads to a smoothing approach which increases an ingress of infiltrated air altogether when there is a lower furnace pressure and a higher temperature in the regenerator and decreases it when the temperature and consequently the density of the air in the regenerator falls or the furnace pressure rises. In simplified terms, the smoothing approach according to the model-based functional determination of the infiltrated air as prescribed above has the effect of creating a kind of flue model for a regenerator that can be used for modeling an ingress of infiltrated air, so that an infiltrated air profile filtered by this model can be entered into the quantitative control for the gaseous oxygen carrier.

It is preferably provided that the option concerning the further allowance for air corrections or the oxygen fraction of a value of the air corrections
makes allowance for a tolerance of the energy requirement (E), and/or
the energy requirement is reduced by an adjustable tolerance variable,
in particular wherein the tolerance variable is set at least to such a magnitude that inaccuracies in the determination of the energy content of the fuel do not change the setpoint value of the flow of the gaseous oxygen carrier, in particular the flow of combustion air (SP_COMBAIR) and/or flow of oxygen (SP_OXYGEN).

A development in this respect—concerning combustion air—relates to a method in which the setpoint value of the volumetric flow of combustion air (SP_COMBAIR) follows the MAXIMUM of the energy SETPOINT value (SP_ENERGY) and the energy process value (PV_ENERGY), wherein the process value (PV_ENERGY) is reduced by an adjustable tolerance variable which is preferably set at least to such a magnitude that inaccuracies in the determination of the energy content of the fuel gas do not change the setpoint value of the flow of combustion air (SP_COMBAIR).

Correspondingly, a development in this respect—concerning oxygen—relates to a method in which the setpoint value of the flow of oxygen (SP_OXYGEN) follows the MAXIMUM of the energy SETPOINT value (SP_ENERGY) and the energy process value (PV_ENERGY) wherein the process value PV_ENERGY is reduced by an adjustable tolerance variable which is preferably set at least to such a magnitude that inaccuracies in the determination of the energy content of the fuel gas do not change the setpoint value of the flow of oxygen (SP OXYGEN).

In addition or alternatively, it has proven to be advantageous within the scope of a particularly preferred development that the energy requirement (E) is determined as a setpoint variable for the technologically necessary energy requirement (E) of the industrial furnace or a furnace region to be controlled, preferably with allowance for a thermal efficiency ($\mu\_therm$), in particular a variable thermal efficiency. In particular, in addition or alternatively, such an energy SETPOINT value (SP_ENERGY), preferably with allowance for the thermal efficiency ($\mu\_therm$), in particular the variable thermal efficiency, may be determined in particular as a quotient (SP_ENERGY/$\mu\_therm$) of the energy SETPOINT value (SP_ENERGY) and the thermal efficiency ($\mu\_therm$). The quotient (SP_ENERGY/$\mu\_therm$) may preferably go into the determination of the volumetric flow of combustion air (SP_COMBAIR) and/or the volumetric flow of oxygen (SP_OXYGEN) instead of the energy SETPOINT value (SP_ENERGY). This development has advantageously recognized that a thermal efficiency that is preferably variable over time can already advantageously make allowance for acceptable variations in the energy requirement; at least those that are not already able to be covered by an aforementioned tolerance variable. This applies in particular to changes in the thermal requirement, such as are caused by the entering and exiting of flue gas and air. To this extent, the thermal efficiency can also be represented as a consequence and/or a function of the furnace and ambient temperature and also energy inputs and outputs of flue gas and combustion air.

According to a particularly preferred development, it is provided that the flow of fuel, in particular as a process value of a volumetric flow of fuel (SP_FUELGAS), is determined with allowance for the stated quotient and optionally with correction by way of a fuel limitation and/or further fuel corrections.

It is preferably provided that the option concerning the fuel limitation
makes allowance for a tolerance of the quantity of fuel, and/or
the fuel setpoint value (SP_FUELGAS) is limited by a factor formed by the quotient (PV_COMBAIR*(1+TLZ)/SP_COMBAIR, PV_COMBAIR*(1+TLZ)/SP_OXYGEN) of the combustion air and/or oxygen process value, increased by an adjustable tolerance variable (TLZ), divided by the setpoint value of the flow of combustion air (SP_COMBAIR) and/or flow of oxygen (SP_OXYGEN); in particular the limiting factor should be limited upwardly to 1.0,
and/or wherein the tolerance variable (TLZ) should be set such that unavoidable variations in the measurement of the quantitative flow of combustion air (PV_COMBAIR) do not influence the setpoint value (SP_COMBFUEL) and unavoidable variations in the measurement of the quantitative flow of combustion air/oxygen (PV_COMBAIR, PV_OXYGEN) do not influence the setpoint value (SP_COMBFUEL, SP_OXYGEN).

A development in this respect—concerning combustion air—relates to a method in which the fuel gas setpoint value (SP_FUELGAS) is limited by a factor formed by the quotient (PV_COMBAIR*(1+TLZ)/SP_COMBAIR) of the combustion air process value, increased by an adjustable tolerance variable (TLZ), divided by the setpoint value of the flow of combustion air, wherein the limiting factor should be limited upwardly to 1.0, and wherein the tolerance variable (TLZ) should be set such that unavoidable variations in the measurement of the quantitative flow of combustion air (PV_COMBAIR) do not influence the setpoint value (SP_COMBFUEL).

A development in this respect—concerning oxygen—relates to a method in which the fuel gas setpoint value (SP_FUELGAS) is limited by a factor formed by the quotient (PV_OXYGEN*(1+TLZ)/SP_OXYGEN) of the combustion air process value, increased by an adjustable tolerance variable (TLZ), divided by the setpoint value of the flow of combustion air, wherein the limiting factor should be limited upwardly to 1.0, and wherein the tolerance variable (TLZ) should be set such that unavoidable variations in the measurement of the quantitative flow of combustion air (PV_COMBAIR) do not influence the setpoint value (SP_COMBFUEL).

It is preferably provided that the option concerning further fuel corrections, in addition to the corrections of the fuel setpoint value, in particular fuel gas setpoint value (SP_FUELGAS), a correction factor that makes allowance for a change in the energy requirement due to a changed quantity of flue gas is applied and/or a variable (AMINE) of stoichiometric volume of flue gas per unit of energy is formed, the changing of which should be fed forward to the original energy setpoint value (SP_ENERGY).

A development in this respect concerns a method in which, in addition to the corrections of the fuel gas setpoint value (SP_FUELGAS), a correction factor that makes allowance for a change in the energy requirement due to a changed quantity of flue gas is applied. For this purpose, a variable (AMINE) of a stoichiometric volume of flue gas per unit of energy is formed, the changing of which should be fed forward to the original energy SETPOINT (SP_ENERGY).

It is provided in particular that the specified, in particular constantly specified air/oxygen excess (SP_LAMBDA), is obtained from a technologically optimized process control and/or is set with regard to a near-stoichiometric or substoichiometric combustion ($\lambda <= 1$).

Exemplary embodiments will now be described below on the basis of the drawing. This is not necessarily intended to show the exemplary embodiments to scale; rather, where it serves for explanation, the drawing is presented in a schematized and/or slightly distorted form. With regard to supplements to the teachings that are directly evident from the drawing, reference is made to the relevant prior art. It should be taken into account in this respect that various modifications and amendments concerning the form and detail of an embodiment can be made without departing from the general idea of the disclosure. Even though the disclosure is described in the present case by the example of a regeneratively heated industrial furnace for a glass melting application, the method described here and the concept of the device and the open-loop and closed-loop control unit can equally be of interest and be used for non-regenerative types of furnace, as are known for example as a recuperative melting end, unit melter and oxy-fuel melting end (the latter operated with oxygen as the gaseous oxygen carrier, but always without a regenerator).

The features of the disclosure that are disclosed in the description, in the drawing and in the claims may be essential for the development of the disclosure both individually and in any desired combination. Moreover, the scope of the disclosure covers all combinations of at least two of the features that are disclosed in the description, the drawing and/or the claims. The general idea of the disclosure is not restricted to the exact form or the detail of the preferred embodiment shown and described below or restricted to a subject matter that would be limited in comparison with the subject matter that is claimed in the claims. Where dimensional ranges are indicated, values lying within the stated limits are also intended to be disclosed as limit values, and to be able in any way to be used and to be claimed.

BRIEF DESCRIPTION OF THE SEVERAL VIEWS OF THE DRAWINGS

Further advantages, features and details of the invention emerge from the following description of the preferred exemplary embodiments and also on the basis of the drawing, in which:

FIG. 1 shows a diagrammatic representation of a regeneratively heated industrial furnace with a left regenerator and a right regenerator, in the case of which a control unit with a temperature control module and a control module for a supply of fuel and a supply of combustion air is provided according to a particularly preferred embodiment;

DETAILED DESCRIPTION

Figure 2A:
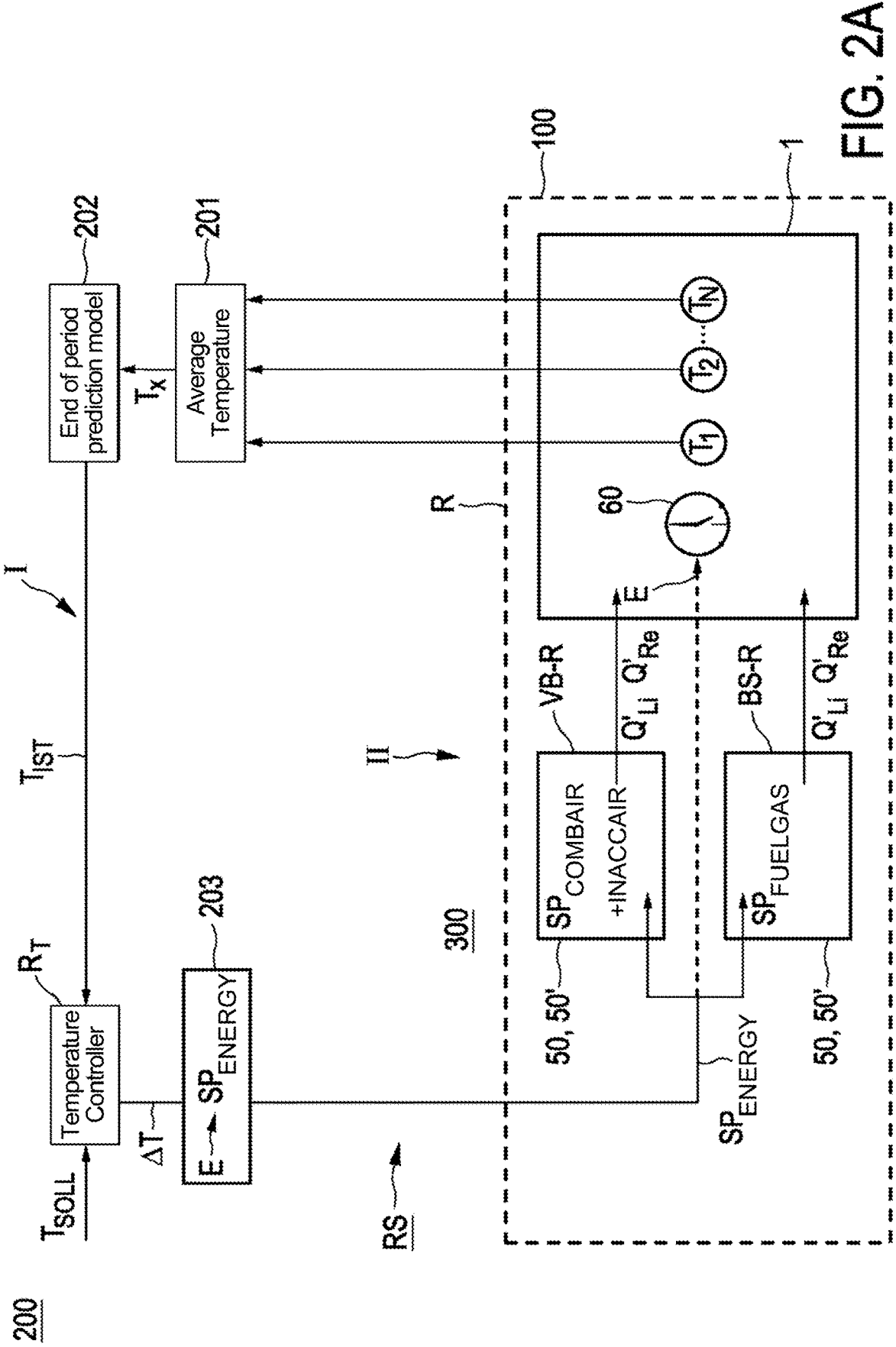
FIG. 2A and FIG. 2B show a schematic representation of a first and a second particularly preferred embodiment of a method for controlled operation of a regeneratively heated industrial furnace with a control loop for a temperature control and a control of the supply of fuel and the supply of combustion air for a control unit of FIG. 1.

FIG. 1 shows in a simplified representation a regeneratively heated industrial furnace 100 with a furnace chamber 10, the upper furnace chamber 1 of which is controlled as a controlled system and in which the lower furnace chamber 2 has a glass melting end that is not shown any more specifically. Glass contained in the glass melting end is heated by way of the furnace chamber 10 above the melting temperature and is melted and suitably treated for the production of flat glass or the like. The industrial furnace 100 is in the present case heated by fuel, in the present case in the form of fuel gas, being injected into the upper furnace 1 by way of a number of laterally attached fuel injectors 20. Of the fuel injectors 20, in the present case a left injector 20 is shown. Of the further fuel injectors 20', in the present case a right injector 20' is shown. For the sake of simplicity, the same designations are used below for parts that are the same or similar or parts that have the same or a similar function.

For example, a number of six injectors 20, 20' may be respectively provided on the left side and on the right side. In the firing period that is shown in FIG. 1, fuel gas is injected into the upper furnace 1 virtually without combustion air by way of a fuel injector 20. Above the fuel injector 20, preheated combustion air VB is fed to the upper furnace 1 by way of a left opening 30.

The combustion air from the opening 30 mixes in the upper furnace 1 with the fuel gas injected by the fuel injector 20 and leads to the formation of a flame 40, which covers the lower furnace and is shown here symbolically. The image of FIG. 1 shows the industrial furnace 100 in a state of regenerative firing by way of the left regenerator 50 and the left injectors 20. These and the opening 30 is designed in such a way that the fuel gas supplied by way of the injectors 20 is mixed in a sufficient near-stoichiometric or substoichiometric range with combustion air of the left regenerator in the upper furnace 1. The operating state shown in FIG. 1 of a left firing of the upper furnace 1 with injection of fuel gas by way of the left injectors 20 and supply of combustion air VB by way of the left regenerator 50 lasts for a first time period of for example 20 to 40 minutes. The duration of the periods is shown symbolically here by a clock 60. During this first time period, combustion air VB is fed to the upper furnace 1 in the furnace chamber 10 separately from the fuel gas 20. During the first time period, flue gas AG from the upper furnace 1 is fed by way of right openings 30' to the right regenerator 50' and heats up the latter.

In a second operating state, the firing of the upper furnace 1 is reversed for a second time period of a similar length of time. The duration of the periods is shown symbolically here by a clock 60. For this purpose, combustion air VB is then fed by way of the right regenerator 50' to the upper furnace 1 together with fuel gas from the right injectors 20', wherein the combustion air VB then takes up the heat from the flue gas AG that was deposited in the regenerator 50' in the first time period.

In this exemplary embodiment, the control of a flow of fuel and/or a flow of combustion air takes place with preference and in principle by way of a temperature control module 200 of a control unit 1000 for the industrial furnace 100. In principle, a controller, in particular a PID controller, may be used for this purpose in the temperature control module 200, as denoted more specifically in FIG. 2 as TEMPERATURE CONTROLLER R_T. According to this, with an increase in the flow of fuel, of a fuel BS (with preference fuel gas), and/or of the flow of combustion air, of the combustion air VB, a furnace chamber temperature T_IST is raised, and with a decrease in the flow of fuel, of the fuel BS (with preference fuel gas), and/or a flow of combustion air, of the combustion air VB, a furnace chamber temperature T_IST is lowered; this takes place as prescribed by the quantity determination module 300 shown in in FIG. 1.

For this purpose, temperature values of the regenerator head 51 or 51' or of the upper furnace chamber 1 are fed to the temperature control module 200 by way of suitable temperature probes 52, 52', 53, which in the present case are at least also partly combined with a suitable lambda probe for measuring a fuel-air ratio. In particular, the temperature T_IST measured by way of the temperature probe 53 in the upper furnace serves as an input for the temperature control module 200, for example in order on the basis thereof to perform a temperature averaging and an extrapolation of the temperature behavior to the end of a time period. In particular, the temperature probes 52, 52', and in the present case also the temperature probe 53, provide measured temperatures to the input of a quantity determination module 300.

Figure 2B:
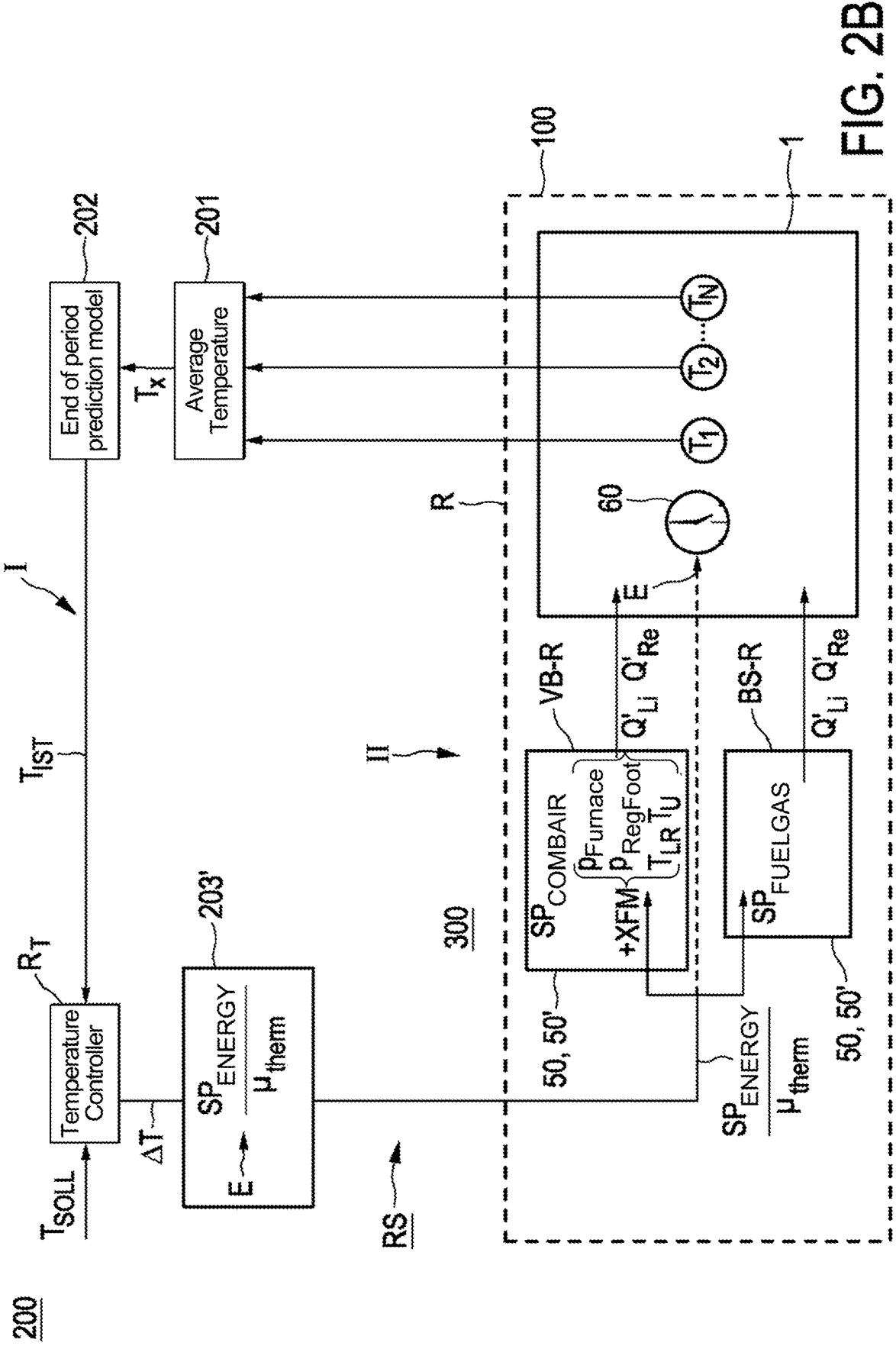

In particular, the temperatures at a regenerator head, as measured by the temperature probes 52, 52', can serve as a basis for the further control loop shown in FIG. 2A and FIG. 2B for determining and setting the flow of fuel, of a fuel BS (with preference fuel gas), and/or of the flow of combustion air, of the combustion air VB. The lambda probes or other measuring sensors possibly arranged at the same location may also provide measured values, for example concerning air or quantities of flue gas, for a simplified determination.

Furthermore, an industrial furnace 100 of FIG. 1 has a sensor system for measuring a furnace pressure p_Furnace, a pressure at the foot of the regenerator p_RegFoot, a temperature of the combustion air in the regenerator T_VB and a temperature of the surroundings of the furnace T_U; in particular, in this way a model-based functional determination of the infiltrated air can be implemented, wherein the infiltrated air or the oxygen fraction of the value of the infiltrated air is determined as a function XFM (p_Furnace, p_RegFoot, T_VB, T_U).

With reference to FIG. 2A and FIG. 2B, the first part I of the control loop of the temperature control module 200 and the second part II of the control loop of the quantity determination module 300 are now described more specifically.

FIG. 2A and FIG. 2B schematically illustrate the setup of a first part I of a control loop RS for a temperature control of a temperature control module 200 and also the setup of a second part II of the control loop RS for a determination of the quantity of the combustion air VB and/or the fuel BS—specifically a setpoint value SP_COMBAIR of the quantitative combustion air control VB-R realized in this sense—and/or a setpoint value of the flow of fuel gas SP_FUELGAS—of the quantitative fuel control BS-R realized in this sense—in the quantity determination module 300 of the control respectively concerning the left and right regenerator 50, 50; which are shown here with their quantities of heat Q'_Li and Q'-Re that are correspondingly to be introduced.

Even though the manner of description is chosen here for a fuel BS in the form of fuel gas, nevertheless reference is made in the following to a fuel in general, which to this extent may also be oil, coal dust or some other fuel; fuel gas is preferred in the present case. Even though the description of an oxygen carrier as combustion air VB is chosen here, nevertheless reference is made in the following to an oxygen carrier in general, which to this extent may indeed also be formed in particular as air (combustion air) but also as oxygen, i.e., gas with an oxygen fraction >99%; i.e., generally a gaseous oxygen carrier such as for example air with a 20.94% oxygen fraction, technical oxygen with a virtually 100% oxygen fraction, but similarly also combustion air enriched with oxygen, with for example an oxygen fraction of 21 . . . 25%, or combustion air depleted with flue gas with for example an oxygen fraction of 17 . . . 21%.

The control is explained on the basis of a preferred embodiment of a method for controlled operation of the regeneratively heated industrial furnace 100 shown by way of example in FIG. 1. The first part, denoted by I, of the control loop RS represents temperature control with controller R_T.

For the first control loop I, a furnace chamber temperature T serves as a controlled variable. For this purpose, a number of representative upper furnace temperatures $T_1, T_2 \ldots T_N$ are measured, for example by suitable temperature sensors 52, 52', 53, possibly with suitable correction. In particular, the temperature sensor 53 serves for picking up the furnace chamber temperature T. The temperature values adapted to an upper furnace temperature from the various temperatures $T_1, T_2 \ldots T_N$ are averaged in an averaging unit 201 to form a weighted temperature average T. Subsequently, the value of the temperature average $T_x$ is fed to an extrapolation unit 202, which is capable of forming a prediction of the actual value of the temperature $T_{IST}$ at the respective end of a firing period of the regenerative heating as prescribed by a typical time profile of the representative upper furnace temperature. Specifically this predicted temperature $T_{IST}$ forms the actual value of the temperature controller R_T instead of the temperature value $T_x$ at the particular time. The temperature controller R_T is formed in the present case in the form of a PID controller, to which a setpoint value of the temperature T_SOLL is also fed and which determines from the difference therebetween a requirement for fuel energy E.

The second part, denoted by II, of the control loop RS represents the determination of the quantity of the combustion air VB and/or the fuel BS concerning the left and the right regenerator 50, 50'.

For both parts I, II of the control loop RS, the upper furnace 1 in the furnace chamber 10 of the furnace 100 serves as part of the controlled system R that is denoted by R. The controlled system R also comprises the left regenerator 50 and the right regenerator 50' and also the locations of the heat Q_Li and Q_Re provided by the regenerators 50, 50' from preheated combustion air VB, which are fed to the upper furnace 1. In the actual sense, these are flows of heat, which in FIG. 2A and FIG. 2B are assigned to the regenerators 50, 50' and represented by corresponding symbols.

The aim of the furnace temperature control and the quantity determination for combustion air VB and fuel BS with the control loop RS is to determine as predictively as possible the quantity of fuel and/or combustion air that dependably provides the technologically desired furnace temperature T_SOLL—and to do so when there are changing loads and variable disturbing factors. A stable, uniform flow of fuel without unnecessary variations is a further prerequisite for efficient heating. It should accordingly not be the task of the temperature controller to try to compensate for the unavoidable temperature drop of the crown during about 35 . . . 40 seconds of firing-free time during the changeover by increased charging with fuel—another reason why a simple PID controller cannot perform the task. It should however accordingly also not be the task of the temperature controller—that is to say the first part I of the control loop RS—to take into account the unavoidable variations of the calorific value of a fuel BS; the present embodiment consequently provides a quantitative combustion air control VB-R and a quantitative fuel control BS-R, explained more specifically below.

As a difference from the prior art, it is deliberately not the energy requirement E divided by the calorific value of the fuel BS and corresponding to the temperature requirement (quantity of fuel=E/CALORIFIC VALUE) that is further processed for this purpose as the quantity of fuel. Provided instead is a particularly preferred quantitative combustion air control VB-R and a quantitative fuel control BS-R, which is in particular capable of taking into account variations of the calorific value of a fuel BS.

This quantitative combustion air control VB-R and a quantitative fuel control BS-R are first directly fed an energy value E determined from a temperature requirement $\Delta T = T\_IST - T\_SOLL$ of the furnace in the module 203; i.e., the control method according to this embodiment works with this energy value E—specifically the desired energy SETPOINT value of the desired energy charge SP_ENERGY—that is to be fed to the furnace, upper furnace or other part of the industrial furnace in the given temperature situation on the one hand and the given operating requirement on the other hand; in other words, the technologically necessary energy requirement E of the furnace.

Therefore, a setpoint variable for the technologically necessary energy requirement E of the industrial furnace or a furnace region to be controlled is formed in the module 203 with SP_ENERGY, for example in [MW].

The energy SETPOINT value SP_ENERGY may indeed also be independent of the aforementioned temperature control in part I of the control loop RS (for example as a result of being manually specified by the operator of the installation or as a result of a higher-level temperature control or a furnace model).

Figure 3A:
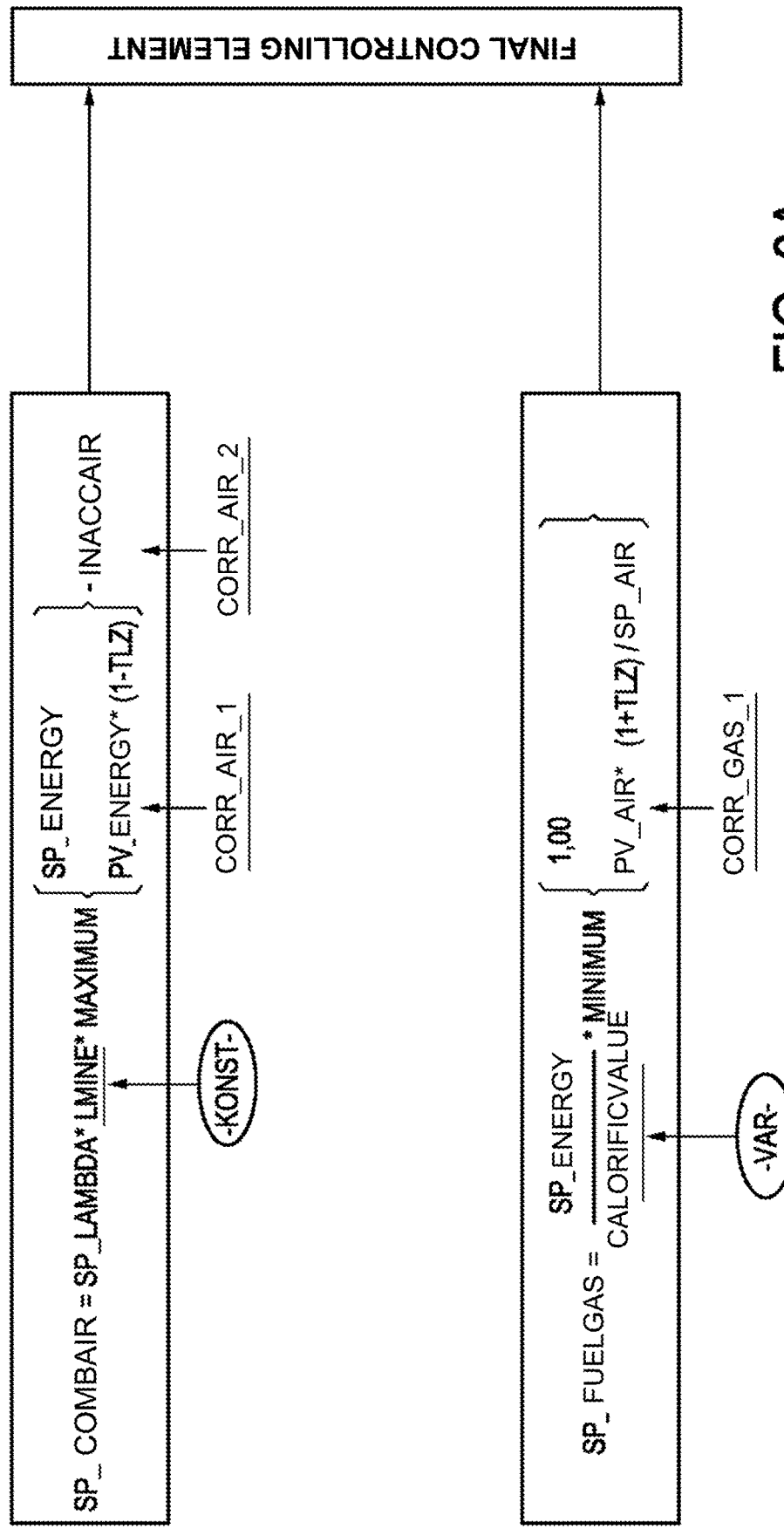
FIG. 3A and FIG. 3B show a schematic representation of the first and second particularly preferred embodiments of a control of the supply of fuel and the supply of combustion air for a control unit, which in combination with a temperature control as in FIG. 2A or FIG. 2B but also independently of a temperature control, for example with a manual setting of the temperature or with a control or precontrol—this may for example result from a furnace model, a simulation, a characteristic curve or empirical values or a similar assumption.

Overall, however, according to a first embodiment—as explained by FIG. 3A—it is set (as for example in the present case according to the exemplary embodiment of FIG. 2A in an automated manner in the module 203), such that a specified temperature T_SOLL is maintained, with a view to a quantity of product that is to be heated at the particular time, and at the same time possibly varying energy losses are compensated; that is to say, symbolically $\Delta T = T\_IST - T\_SOLL$ is controlled to a value close to ZERO.

Figure 3B:
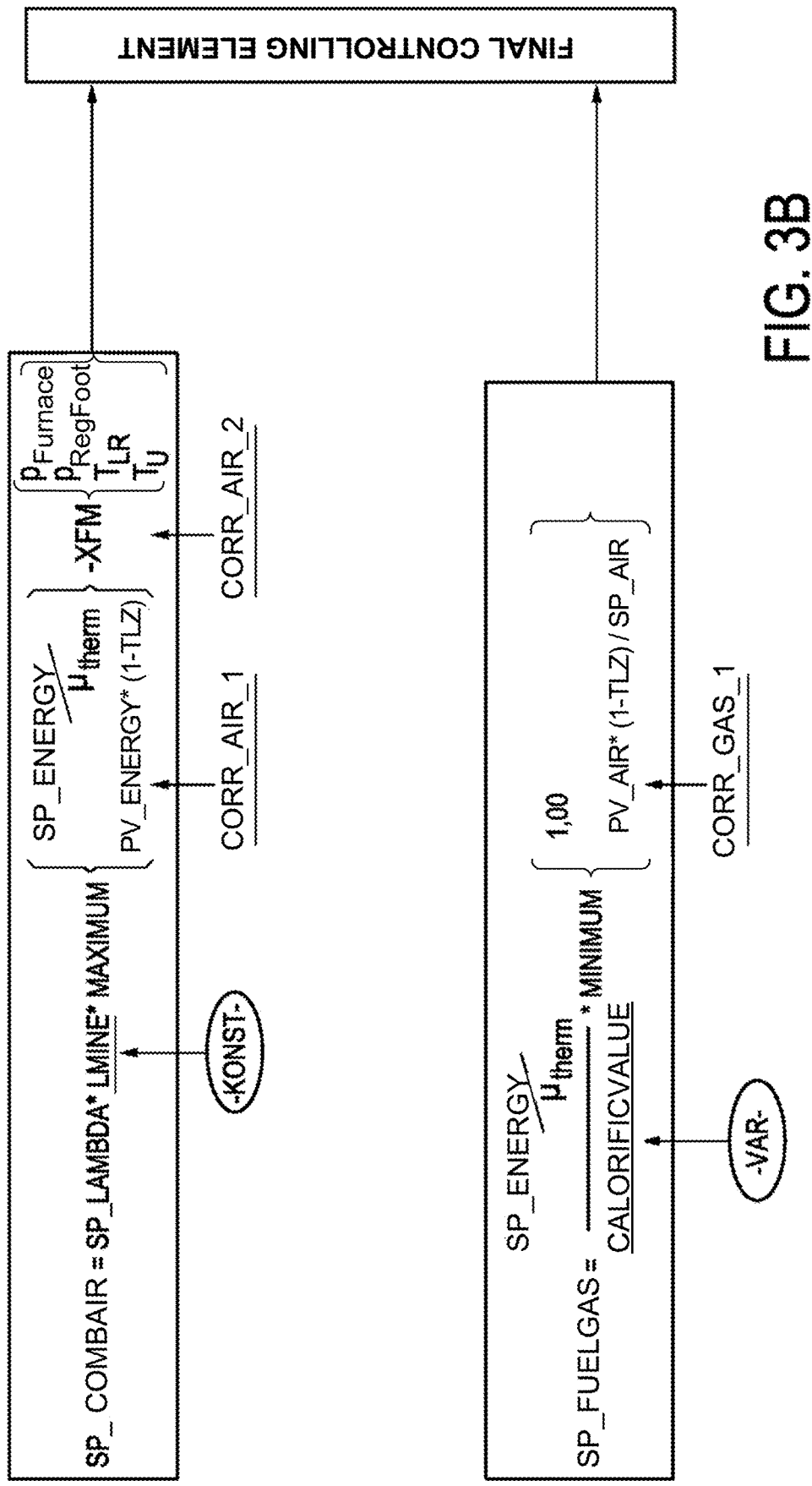

Overall, also according to a second embodiment—as explained by FIG. 3B—the quotient SP_ENERGY/$\mu$_therm of the energy SETPOINT value SP_ENERGY and a thermal efficiency $\mu$_therm is set (as for example in the present case according to the exemplary embodiment of FIG. 2B in an automated manner in the module 203) such that a specified temperature T_SOLL is maintained, with a view to a quantity of product that is to be heated at the particular time, and at the same time possibly varying energy losses are compensated; that is to say, symbolically $\Delta T = T\_IST - T\_SOLL$ is controlled to a value close to ZERO. In the case of the second embodiment, the quotient SP_ENERGY/$\mu$_therm preferably goes into the determination of the volumetric flow of combustion air SP_COMBAIR and/or the volumetric flow of oxygen SP_OXYGEN and/or the volumetric flow of fuel gas SP_FUELGAS instead of the energy SETPOINT value SP_ENERGY.

It is thus found—implemented in the second part II of the control loop RS in the case of FIG. 2A and FIG. 2B—that the coefficient of the stoichiometric combustion air/oxygen requirement (in the case of combustion air, the combustion air requirement; in the case of oxygen, the oxygen requirement) per unit of energy on the one hand and energy content of the fuel on the other hand is virtually a constant over a wide range of varying fuel composition. This is denoted here as a constant, of for example OMINE=stoichiometric oxygen requirement per unit of energy, for example as [Nm3 oxygen/kWh fuel energy]; or LMINE=stoichiometric combustion air requirement per unit of energy, for example as [Nm3 combustion air/kWh fuel energy]

where LMINE=OMINE/0.2094; or generally where LMINX=OMINE/(oxygen fraction of the oxygen carrier, of for example 0.17 or 0.25) for a generalized oxygen carrier. Air is to this extent a special case thereof with 0.2094.

The coefficients (preferably constants) of the stoichiometric combustion air/oxygen requirement per unit of energy on the one hand and energy content of the fuel on the other hand OMINE and LMINE and LMINX can be treated as constant over long time periods and are not influenced by short-term changes in the calorific value, i.e., are unchanged at least over hours, usually over days and weeks. Here, the designation "energy-related air/oxygen" constant or else "energy lambda" constant (LMINE, OMINE, LMINX or the like) is chosen generally for LMINE, OMINE, LMINX or similar constants.

A quantitative combustion air control VB-R and a quantitative fuel control BS-R—described by way of example according to FIG. 2A—of the following form are therefore claimed generally as a concept:

--- volumetric flow of combustion air SP_COMBAIR ~ (equal or proportional) $\lambda$
  * (multiplied by)
"energy-related air/oxygen" constant (LMINE, OMINE, LMINX)
  *(multiplied by)

energy SETPOINT value SP_ENERGY or energy requirement E,
   and also
   optionally, suitable corrections (CORR_AIR_1, Figure 3) for this,
   such as for example infiltrated air corrections (CORR_AIR_2,
   Figure 3);
and/or
   flow of fuel gas SP_FUELGAS ~ (equal or proportional)
   energy SETPOINT value SP_ENERGY or energy requirement E
   / (divided by)
   CALORIFIC VALUE,
      and also
   optionally, suitable corrections (KORR_GAS_1, Figure 3) for this,
   such as for example inert gas fraction corrections.

Specifically, a quantitative combustion air control VB-R and a quantitative fuel control BS-R of a particularly preferred special form, which is explained below, are realized in the exemplary embodiment of FIG. 3. SP_ENERGY is not influenced by a continuous on-line measurement of the quality of the fuel gas at the particular time.

The setpoint value for the flow of combustion air SP_AIR is continuously determined at the particular time while applying a variable of the stoichiometric combustion air/oxygen requirement per unit of energy LMINE that is determined over a long time and is treated as constant over relatively long time periods:

$$SP\_AIR = SP\_LAMBDA * LMINE * \mathrm{MAXIMUM}\left\{\frac{SP\_ENERGY}{PV\_ENERGY * (1 - TLZ)}\right\} - INGAIR$$

in which:
   SP_AIR is the setpoint value of the quantitative combustion air control
   SP_LAMBDA represents the oxygen excess that is technologically desired and to be kept constant for optimum process control as a dimensionless characteristic variable,
      where SP_LAMBDA=1 represents the exactly stoichiometric operating mode without any air excess, while for example SP_LAMBDA=1.100 represents a desired air excess of 10% above the stoichiometric minimum or for example SP_LAMBDA=0.980 represents a desired lack of air of 2% below the stoichiometric minimum
   SP_ENERGY is the setpoint value described above of the energy charge
   PV_ENERGY is the process value at the particular time of the same energy charge
   TLZ is a tolerance variable, described in parts of 1.00, for example TLZ=0.10 gives a tolerance with respect to variations of the process value PV_ENERGY at the particular time of 10%, so that an overshooting of the energy charge by 10% with respect to the setpoint value SP_ENERGY does not quite bring about any increase in the setpoint value SP_AIR
   INACCAIR represents the sum of uncontrolled air fractions and is obtained from the continuous comparison of a measurement of residual oxygen and CO in the flue gas of the industrial furnace with the actual charge of combustion air at this industrial furnace.

At the same time, the energy content at the particular time of the fuel gas is determined by continuous on-line measurement as the CALORIFIC VALUE, for example as a lower value Hu in [kWh/Nm3], and is used for the correction of the setpoint value of the flow of fuel gas:

$$SP\_FUEL = \frac{SP\_ENERGY}{CALORIFICVALUE} * \mathrm{MINIMUM}\left\{\frac{1.00}{PV\_AIR * (1 + TLZ)/SP\_AIR}\right\}$$

Consequently, any predictive correction of variations of the quality of fuel gas is applied just to the setpoint value of the flow of fuel gas in order to keep the energy input constant. For safety reasons, for the case where the quantity of combustion air is too small, the setpoint value of the quantity of fuel gas is consequently limited by a factor $$LIMITATION = \frac{PV_{AIR} * (1 + TLZ)}{SP\_AIR}$$

in which:
   SP_FUELGAS is the setpoint value for the control circuit
   SP_ENERGY is the same setpoint energy value that is also used for the determination of the setpoint value of the flow of combustion air SP_COMBAIR
   CALORIFICVALUE is the lower calorific value Hu of the fuel gas as the value measured at the particular time
   SP_AIR is the setpoint value of the flow of combustion air
   PV_AIR is the measured process value of the flow of combustion air
   TLZ is a tolerance variable as part of 1.

(2.) Generally claimed therefore as a concept are a quantitative combustion air control VB-R and a quantitative fuel control BS-R—described by way of example according to FIG. 2B—of the form:

volumetric flow of combustion air SP_COMBAIR ~ (equal
   or proportional)      λ
      * (multiplied by)
"energy-related air/oxygen" constant (LMINE, OMINE, LMINX)
      *(multiplied by)
      quotient SP_ENERGY/ μ_therm of the energy SETPOINT value
      SP_ENERGY and the thermal efficiency μ_therm, i.e., the
      energy SETPOINT value SP_ENERGY or the energy requirement E
      corrected by a thermal efficiency μ_therm
         and also
      optionally, suitable corrections (CORR_AIR_1, Figure 3B) for this,
      such as for example infiltrated air corrections (CORR_AIR_2,
      Figure 3 B);
and/or
   the flow of fuel gas SP_FUELGAS ~ (equal or proportional)
   quotient SP_ENERGY/ μ_therm of the energy SETPOINT value
   SP_ENERGY and the thermal efficiency μ_therm, i.e., of the energy
   SETPOINT value SP_ENERGY or energy requirement E corrected
   by a thermal efficiency μ_therm
   / (divided by)
   CALORIFIC VALUE,
      and also
   optionally, suitable corrections (KORR_GAS_1, Figure 3B) for this,
   such as for example inert gas fraction corrections.

Specifically, a quantitative combustion air control VB-R and a quantitative fuel control BS-R of a particularly preferred special form, which is explained below, are realized in the exemplary embodiment of FIG. 3B. SP_ENERGY is not influenced by a continuous on-line measurement of the quality of the fuel gas at the particular time.

The setpoint value for the flow of combustion air SP_AIR is continuously determined at the particular time while applying a variable of the stoichiometric combustion air/oxygen requirement per unit of energy LMINE that is determined over a long time and is treated as constant over relatively long time periods:

$$SP\_LUFT = SP\_LAMBDA * LMINE *$$
$$\text{MAXIMUM} \left\{ \begin{array}{c} SP\_ENERGY / \mu\_therm \\ PV\_ENERGY * (1 - TLZ) \end{array} \right\} - XFM$$

in which, apart from the quotient $SP\_ENERGY/\mu\_therm$ of the energy SETPOINT value SP_ENERGY and the thermal efficiency $\mu\_therm$:

SP_AIR is the setpoint value of the quantitative combustion air control

SP_LAMBDA represents the oxygen excess that is technologically desired and to be kept constant for optimum process control as a dimensionless characteristic variable,
  where SP_LAMBDA=1 represents the exactly stoichiometric operating mode without any air excess, while for example SP_LAMBDA=1.100 represents a desired air excess of 10% above the stoichiometric minimum or for example SP_LAMBDA=0.980 represents a desired lack of air of 2% below the stoichiometric minimum SP_ENERGY is the setpoint value described above of the energy charge PV_ENERGY is the process value at the particular time of the same energy charge TLZ is a tolerance variable, described in parts of 1.00, for example TLZ=0.10 gives a tolerance with respect to variations of the process value PV_ENERGY at the particular time of 10%, so that an overshooting of the energy charge by 10% with respect to the setpoint value SP_ENERGY does not quite bring about any increase in the setpoint value SP_AIR INACCAIR represents the sum of uncontrolled air fractions and is obtained from the continuous comparison of a measurement of residual oxygen and CO in the flue gas of the industrial furnace with the actual charge of combustion air at this industrial furnace.

Therefore, here the quotient $SP\_ENERGY/\mu\_therm$ of the energy SETPOINT value SP_ENERGY and the thermal efficiency $\mu\_therm$ goes into the determination of the volumetric flow of combustion air SP_COMBAIR instead of the energy SETPOINT value SP_ENERGY. In simplified terms, this specification of a thermal efficiency $\mu\_therm$ has the consequence that allowance for energy losses is made in the furnace control in such a way that control is performed with the quotient $SP\_ENERGY/\mu\_therm$, that is to say with the energy remaining in the furnace. At the same time, the energy content at the particular time of the fuel gas is determined by continuous on-line measurement as the CALORIFIC VALUE, for example as a lower value Hu in [kWh/Nm3], and is used for the correction of the setpoint value of the flow of fuel gas:

$$SP\_FUEL = $$
$$\frac{SP\_ENERGY/\mu\_therm}{CALORIFICVALUE} * \text{MINIMUM} \left\{ \begin{array}{c} 1.00 \\ PV\_AIR * (1 + TLZ) / SP\_AIR \end{array} \right\}$$

Consequently, any predictive correction of variations of the quality of fuel gas is applied just to the setpoint value of the flow of fuel gas in order to keep the energy input constant. For safety reasons, for the case where the quantity of combustion air is too small, the setpoint value of the quantity of fuel gas is consequently limited by a factor $$\text{LIMITATION} = \frac{PV\_AIR * (1 + TLZ)}{SP\_AIR}$$

in which:

SP_FUELGAS is the setpoint value for the control circuit

SP_ENERGY is the same setpoint energy value that is also used for the determination of the setpoint value of the flow of combustion air SP_COMBAIR CALORIFICVALUE is the lower calorific value Hu of the fuel gas as the value measured at the particular time SP_AIR is the setpoint value of the flow of combustion air PV_AIR is the measured process value of the flow of combustion air TLZ is a tolerance variable as part of 1

Here, too, therefore the quotient $SP\_ENERGY/\mu\_therm$ of the energy SETPOINT value SP_ENERGY and the thermal efficiency $\mu\_therm$ goes into the determination of the volumetric flow of fuel gas SP_FUELGAS instead of the energy SETPOINT value SP_ENERGY.

The aforementioned particularly preferred second embodiment uses with advantage provided two developing variants in comparison with the first embodiment.

On the one hand, for making allowance for the infiltrated air for purposes of open-loop and/or closed-loop control, a mathematical model of this controlling variable is used, used on the basic variables of the furnace pressure p_Furnace, the pressure at the foot of the regenerator p_RegFoot, the temperature of the combustion air in the regenerator T_LR and the ambient temperature T_U. While in the case of the first embodiment the infiltrated air is still determined essentially as the result of an air balance by measuring an air excess (essentially the O2/CO2 ratio in the regenerator), it has been recognized according to the second embodiment that the infiltrated air can be reproduced quite well, at least in its recurring trends, by the mathematical model in its fundamentally periodic structure. This ultimately leads to an anticipatory prediction of an infiltrated air trend. The closed-loop control and/or open-loop control is thus capable of controlling closer to the actual behavior, and consequently responding more quickly or in an anticipatory manner to changes in the controlled system (industrial furnace).

The infiltrated air is consequently determined from a model-based functional determination, wherein the infiltrated air or the oxygen fraction of the value of the infiltrated air is determined, as a function XFM of the furnace pressure p_Furnace, the pressure at the foot of the regenerator p_RegFoot, the temperature of the combustion air in the regenerator (T_VB) and a temperature of the surroundings of the furnace T_U. Consequently, for the first time in the process of forming a model, the infiltrated air is modeled as a correcting quantity, to be specific by using the "flue model" explained above for a regenerator. As explained, this makes allowance for the uncontrolled ingress of fresh air (infiltrated air) under the effect of the external pressure and the pressure at the foot of the regenerator (p_RegFoot) against the furnace pressure (p_Furnace). The cyclical temperature development as a consequence of the cyclically recurring extraction of air then models a density of the air in the regenerator; i.e., with the cooling of the air in the regenerator, the density of the air increases. This leads to a cyclically recurring decrease in the infiltrated air. With the heating of the air in the regenerator, the density of the air increases. This leads to a cyclically recurring increase in the infiltrated air. This trend pattern can serve advantageously within the modeled function of the infiltrated air as an approach for a smoothing or other compensation of the measured values of the infiltrated air. Such smoothed values or such compensated values can then be used within a closed-loop control.

Furthermore, the second embodiment uses for the determination of the volumetric flow of combustion air SP_COMBAIR and/or the volumetric flow of oxygen SP_OXYGEN and/or the volumetric flow of fuel gas SP_FUELGAS the quotient of the energy SETPOINT value SP_ENERGY and a thermal efficiency μ_therm. Provided with advantage, this thermal efficiency μ_therm is not constant over time, but instead can be represented as a function of the furnace air and fuel gas variables. This is prescribed on the basis of the recognition that an open-loop control and closed-loop control should advantageously be directed rather at the energy content that is available in the furnace or remains in the furnace (quotient SP_ENERGY/μ_therm) than at the energy requirement that is entered (energy input). The development for this second embodiment has recognized that part of the energy SP_ENERGY indicated as the energy requirement does not in fact remain in the furnace but flows away due to a number of inherent processes. Mention should be made here in any event of the energy content of the outflowing and inflowing flows of air of the outflowing and inflowing flows of flue gas, along with the temperature potentials of the furnace and of the regenerators, which are denoted here by Q_ABGAS for VOL_AG and Q_AIR for VOL_AIR and also T_Furnace and T_Reg.

In addition to this there is the dependence of the thermal efficiency also on the radiation behavior of the flame. Essentially, allowance should be made for this in principle with regard to a carbon to hydrogen ratio C/H of the fuel. Working with the quotient SP_ENERGY/μ_therm instead of the energy SETPOINT value SP_ENERGY—that is to say the energy content remaining in the furnace instead of the energy content introduced (energy input)—produces in the open-loop control and closed-loop control a realistic control approach that is particularly close to the process and can make allowance for the certain recurring trend pattern in the energy requirement. For instance, it produces in particular an advantageous allowance for different fuel contents as the fuel available differs and also the possibility of allowing for certain conditions in the case of different industrial furnaces, for instance when they have particularities or irregularities in the flue gas and air conduits.

Exemplary Embodiments

1. Initial situation (1)=(2)—of which (1) is with ratio control, (2) is with lambda setpoint value.

An industrial furnace—for example a glass melting end—has an energy requirement for material to be heated (melt) and covering the losses through the walls of 12 742 kW and is heated by natural gas with the following thermal characteristics:

| | | |
|---|---|---|
| Calorific value Hu | 10.138 kWh/Nm3 | lower calorific value of the fuel gas |
| LMIN | 9.695 Nm3/Nm3 | stoichiometric air requirement per volume of gas |
| LMINE | 0.9563 Nm3/kWh | stoichiometric air requirement per unit of energy |
| AMINE | 1.0565 Nm3/kWh | stoichiometric volume of flue gas per unit of energy |

Using oxygen probes, 1.3% of residual oxygen was found in the flue gas. From this, the air ratio is determined as LAMBDA=1.079.

The quantity of infiltrated air was determined from the comparison with the measured quantity of air as XF=300 Nm3/h.

The quantity of infiltrated air was determined from the comparison with the measured quantity of air as XF=300 Nm3/h.

The thermal efficiency is 68.89%.

With this efficiency, the energy requirement for gas is E.Gas=12 742/69.89%=18 497 kW. From this, the quantity of gas is SP−Gas=E.Gas/Hu=18 496 kW/10.138 kWh/Nm3=1 824.6 Nm3/h.

To make possible an air excess LAMBDA=1.080, while subtracting the 300 Nm3/h of infiltrated air additionally occurring from uncontrolled sources, the following amount of controlled COMBUSTION AIR must be supplied: COMBAIR=E.Gas*LMINE−XF=18 497 kW*0.9563 Nm3/kWh−300 Nm3/h=18 804 Nm3/h with a specific heat of Cp.AIR=1.329 kJ/K/Nm3 at 1200° C.

The quantity of flue gas is ABGAS=E.Gas*(AMINE+(LAMBDA−1)*LMINE)=22 491 Nm3/h with a specific heat of Cp.Abgas=1.610 kJ/K/Nm3 at 1400° C.

The thermal efficiency is consequently calculated as: ETA.therm=(E.Gas+COMBAIR*Cp.AIR*1200−ABGAS*Cp.Abgas*1400)/E.Gas=68.89% and goes back into the aforementioned calculation recursively; the calculation was repeated recursively until the input value of the thermal efficiency coincides with the result.

2. Higher gas quality (3)

In the same industrial furnace with an unchanged energy requirement of 12 742 kW, a natural gas with a higher calorific value and the following characteristic data is then used:

| | | |
|---|---|---|
| Calorific value Hu | 10.587 kWh/Nm3 | lower calorific value of the fuel gas |
| LMIN | 10.096 Nm3/Nm3 | stoichiometric air requirement per volume of gas |
| LMINE | 0.9537 Nm3/kWh | stoichiometric air requirement per unit of energy |
| AMINE | 1.0522 Nm3/kWh | stoichiometric volume of flue gas per unit of energy |

LMINE=0.9563 Nm3/kWh is used unchanged in the calculation for the changeover.

The quantity of infiltrated air is unchanged XF=300 Nm3/h. The thermal efficiency is 68.93%.

With this efficiency, the energy requirement for gas is E.Gas=12 742/68.93%=18 485 kW.

From this, the quantity of gas is SP−Gas=E.Gas/Hu=18 485 kW/10.587 kWh/Nm3=1 746.1 Nm3/h.

To make possible an air excess LAMBDA=1.080, while subtracting the 300 Nm3/h of infiltrated air additionally occurring from uncontrolled sources, the following amount of controlled COMBUSTION AIR must be supplied: COMBAIR=E.Gas*LMINE−XF=18 485 kW*0.9563 Nm3/kWh−300 Nm3/h=18 792 Nm3/h with a specific heat of Cp.AIR=1.329 kJ/K/Nm3 at 1200° C.

The quantity of flue gas is ABGAS=E.Gas*(AMINE+(LAMBDA−1)*LMINE)=22 448 Nm3/h with a specific heat of Cp.Abgas=1.610 kJ/K/Nm3 at 1400° C.

The thermal efficiency is consequently calculated as:

$$ETA.\text{therm}=(E.\text{Gas}+COMBAIR*Cp.AIR*1200-ABGAS*Cp.Abgas*1400)/E.\text{Gas}=68.93\%$$

and goes back into the aforementioned calculation recursively.

3. Reduced gas quality—L gas instead of H gas (4)

In the same industrial furnace with an unchanged energy requirement of 12 742 kW, a natural gas with a higher calorific value and the following characteristic data is then used:

| | | |
|---|---|---|
| Calorific value Hu | 8.783 kWh/Nm3 | lower calorific value of the fuel gas |
| LMIN | 8.4078 Nm3/Nm3 | stoichiometric air requirement per volume of gas |
| LMINE | 0.9573 Nm3/kWh | stoichiometric air requirement per unit of energy |
| AMINE | 1.0722 Nm3/kWh | stoichiometric volume of flue gas per unit of energy |

LMINE=0.9563 Nm3/kWh is used unchanged in the calculation for the changeover.

The quantity of infiltrated air is unchanged XF=300 Nm3/h. The thermal efficiency is 68.24%.

With this efficiency, the energy requirement for gas is E.Gas=12 742/68.24%=18 672 kW. From this, the quantity of gas is SP−Gas=E.Gas/Hu=18 672 kW/8.783 kWh/Nm3=2 125.9 Nm3/h. As expected, the energy requirement of the initial state with the lower calorific value already requires a greater volume of gas. In addition to this there is the increase in the energy requirement itself in comparison with the initial state as a result of the approximately 13% inert fuel gas constituents in L gas, which do not contribute to the combustion but nevertheless must be heated to the same flue gas temperature.

To make possible an air excess LAMBDA=1.080, while subtracting the 300 Nm3/h of infiltrated air additionally occurring from uncontrolled sources, the following amount of controlled COMBUSTION AIR must be supplied: COMBAIR=E.Gas*LMINE−XF=18 672 kW*0.9563 Nm3/kWh−300 Nm3/h=18 984 Nm3/h with a specific heat of Cp.AIR=1.329 kJ/K/Nm3 at 1200° C.

The quantity of flue gas is ABGAS=E.Gas*(AMINE+(LAMBDA−1)*LMINE)=22 963 Nm3/h with a specific heat of Cp.Abgas=1.610 kJ/K/Nm3 at 1400° C.

The thermal efficiency is consequently calculated as:

$$ETA.therm=(E.Gas+COMBAIR*Cp.AIR*1200-ABGAS*Cp.Abgas*1400)/E.Gas=68.24\%$$

and goes back into the aforementioned calculation recursively.

The invention claimed is:

1. A method for controlled operation of a regeneratively heated industrial furnace, with a furnace chamber with a melting end comprising:
   conducting fuel into the furnace chamber by way of at least one fuel injector configured for the injection of fuel virtually without combustion air,
   conducting a gaseous oxygen carrier into the furnace chamber, wherein
   automatically controlling, using a control loop, a supply of the fuel and a supply of the gaseous oxygen carrier, and
   setting, by a final controlling element, at least one of: a first adjustable manipulated variable in a form of a flow of the fuel into the furnace chamber and a second adjustable manipulated variable in a form of a flow of the gaseous oxygen carrier into the furnace chamber,
   determining, by the control loop, an energy requirement as an energy SETPOINT value,
   feeding, by the control loop, the energy requirement to a quantitative control for the gaseous oxygen carrier and to a quantitative fuel control for the fuel, and
   determining, by the control loop, the flow of the gaseous oxygen carrier as a process value of the flow of the gaseous oxygen carrier, wherein the flow of the gaseous oxygen carrier is determined with allowance for a product of:
      a specified air/oxygen excess,
      the energy requirement as the energy SETPOINT value, and
      a specified stoichiometric combustion air/oxygen requirement, as a quantity of air/oxygen per unit of energy, wherein the quantity of air/oxygen per unit of energy is constantly specified as an energy related air/oxygen constant, and
   determining the flow of fuel as a process value of a volumetric flow of fuel, wherein the flow of fuel is determined with allowance for a quotient of:
      directly the energy requirement as the energy SETPOINT value, and
      a calorific value of the fuel.

2. The method as claimed in claim 1, comprising:
   obtaining, using a technologically optimized process control, the specified air/oxygen excess,
   obtaining the energy requirement as the energy SETPOINT value a specification of a temperature for the furnace chamber, and
   obtaining, based on long-term determination, the specified stoichiometric combustion air/oxygen requirement as the energy-related air/oxygen constant.

3. The method as claimed in claim 1, comprising:
   obtaining, the energy requirement as the energy SETPOINT value from a specification of a temperature for the furnace chamber,
   obtaining the calorific value of the fuel from the fuel at a particular time.

4. The method as claimed in claim 1, wherein:
   the flow of the gaseous oxygen carrier as the process value of a flow of the gaseous oxygen carrier follows:
      the specified stoichiometric combustion air/oxygen requirement as a quantity of air/oxygen per unit of energy, and
      that is obtained from a long-term determination, and the flow of fuel as the process value of the volumetric flow of fuel, follows:
      a variably specified reciprocal of the calorific value of the fuel as a calorific value of the fuel determined at a particular time as a quantity of fuel per unit of energy.

5. The method as claimed in claim 1, further comprising:
   determining the energy requirement based on a system deviation between an actual value of a temperature that is at least one of measured and computationally determined, of the furnace chamber,
   assigning the final controlling element to the control loop,
   integrating the temperature control in the control loop with the furnace chamber temperature as a controlled variable, and
   integrating a PID controller in the control loop.

6. The method as claimed in claim 1, wherein the energy requirement is determined:
   along with specification of a desired temperature of the furnace chamber or of the energy requirement and independently of a temperature control in the control loop, or based on a higher-level temperature control, a simulation on that is based on a furnace model or a pre-control.

7. The method as claimed in claim 1, wherein the industrial furnace is a regeneratively heated industrial furnace and the method further comprises:
periodically alternately conducting the combustion air to the furnace chamber in a first time period and flue gas out of the furnace chamber in a second time period separately from the fuel using a left regenerator and a right regenerator that are assigned to the at least one fuel injector and that are configured to regeneratively store heat from the flue gas and transfer the heat to the combustion air.

8. The method as claimed in claim 1, wherein the flow of the gaseous oxygen carrier is determined as a process value of the flow of the gaseous oxygen carrier while allowing for at least one of: a stated product, subtraction of infiltrated air and/or further air corrections, and subtraction of an oxygen fraction of a value of the infiltrated air and/or an oxygen fraction of a value of the further air corrections.

9. The method as claimed in claim 8, wherein subtracting the infiltrated air or the oxygen fraction of the value of the infiltrated air is an additive or subtractive allowance for the infiltrated air or the oxygen fraction of the value of the infiltrated air.

10. The method as claimed in claim 8, wherein the value of the infiltrated air is obtained from a product of a measured air/oxygen excess multiplied by the stoichiometric combustion air/oxygen requirement as the quantity of air/oxygen per unit of energy and multiplied by an energy input into the furnace as an actual value with an independently measured quantity of air, at an inlet of the furnace, subtracted therefrom as a result of a continuous flue gas analysis at an end of the combustion chamber.

11. The method as claimed in claim 8, further comprising:
obtaining or measuring a time profile of the values for infiltrated air or an oxygen fraction, respectively, of the values of the infiltrated air, and
smoothing or treating with a statistical or error compensation method the time profile, wherein the smoothing or treating with the statistical or error compensation method is obtained from a model-based functional determination of the infiltrated air, and wherein the infiltrated air or the oxygen fraction of the value of the infiltrated air is determined as a function of a furnace pressure, a pressure at a foot of the regenerator, a temperature of the combustion air in the regenerator and a temperature of the surroundings of the furnace.

12. The method as claimed in claim 8, wherein the allowance for further air corrections or the oxygen fraction of the value of the air corrections at least one of: makes an allowance for a tolerance of the energy requirement, and reduced the energy requirement by an adjustable tolerance variable, wherein the tolerance variable is set at least to a magnitude such that inaccuracies in the determination of the energy content of the fuel do not change the setpoint value of the flow of the gaseous oxygen carrier.

13. The method as claimed in claim 1, further comprising:
determining the energy requirement as a setpoint variable for a technologically necessary energy requirement of the industrial furnace or a furnace region to be controlled with allowance for a thermal efficiency,
determining an energy SETPOINT value with allowance for the thermal efficiency as a quotient of the energy SETPOINT value and the thermal efficiency, and
using the quotient for the determination of at least one of:
the volumetric flow of combustion air, the volumetric flow of oxygen and the volumetric flow of fuel gas instead of the energy SETPOINT value.

14. The method as claimed in claim 1, wherein the flow of fuel as the process value of the volumetric flow of fuel is determined with allowance for the quotient and with correction by at least one of: a fuel limitation and further fuel correction.

15. The method as claimed in claim 14, wherein the fuel limitation makes allowance for a tolerance of the quantity of fuel, wherein the fuel setpoint value is limited by a factor formed by the quotient of the combustion air or oxygen process value as increased by an adjustable tolerance variable, and divided by the setpoint value of the flow of combustion air and/or flow of oxygen, wherein the limiting factor is limited to 1.0, and wherein the tolerance variable is set such that variations in the measurement of the quantitative flow of combustion air do not influence the setpoint value and variations in the measurement of the quantitative flow of combustion air/oxygen do not influence the setpoint value.

16. The method as claimed in claim 14, wherein the further fuel corrections, is at least one of: in addition to the corrections of the fuel setpoint value, a correction factor that makes allowance for a change in the energy requirement due to a changed quantity of flue gas being applied, and a variable of stoichiometric volume of flue gas per unit of energy is formed, the changing of which should be fed forward to the original energy SETPOINT value.

17. The method as claimed in claim 1, wherein the specified air/oxygen excess is obtained from a technologically optimized process control or set with regard to a near-stoichiometric or substoichiometric combustion.

18. An open-loop or closed-loop control unit for controlling operation of a heated industrial furnace having a furnace chamber configured to perform the method as claimed in claim 1 and having a control module comprising:
a module for determining the energy requirement as the energy SETPOINT value, and
a control connection for feeding the energy requirement is fed to the quantitative control for the gaseous oxygen carrier and to the quantitative fuel control for the fuel, and wherein the open-loop or closed-loop control unit:
uses the quantitative control for the gaseous oxygen carrier, in which the flow of combustion air is determined as the process value of the flow of the gaseous oxygen carrier, with allowance for a product of:
a specified air/oxygen excess,
the energy requirement as the energy SETPOINT value, and
the specified stoichiometric combustion air/oxygen requirement as the quantity of air/oxygen per unit of energy, wherein with the quantitative control of fuel, in which the flow of fuel is determined as the process value of the volumetric flow of fuel with allowance for a quotient of:
directly the energy requirement as an energy SETPOINT value, and
a calorific value of the fuel.

19. A regeneratively heatable industrial furnace with a furnace chamber having a melting end comprising:
a conduit for fuel into the furnace chamber by way of at least one fuel injector configured to inject fuel virtually without combustion air,
a conduit for the gaseous oxygen carrier to the furnace chamber, wherein
the supply of fuel and the supply of the gaseous oxygen carrier is controlled automatically, and a first adjustable manipulated variable in the form of the flow of fuel to the furnace chamber and/or a second adjustable manipulated variable in the form of the flow of the gaseous oxygen carrier to the furnace chamber is set by a final controlling element, and with the control module of the open-loop and/or closed-loop control unit of claim 18.

* * * * *